Sept. 21, 1937.　　　　E. M. STAPLES　　　　2,093,742
CIRCULAR CUTTING TOOL
Filed May 7, 1934　　　　2 Sheets-Sheet 1
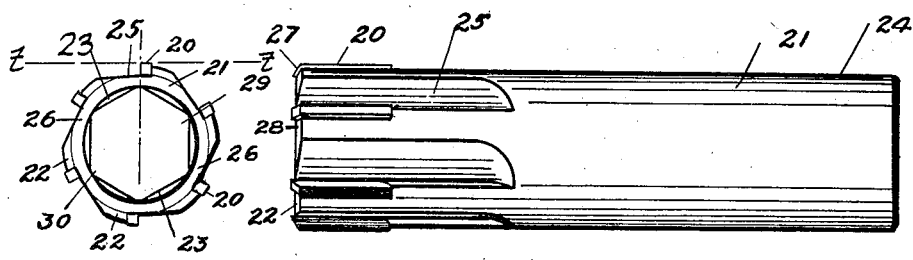
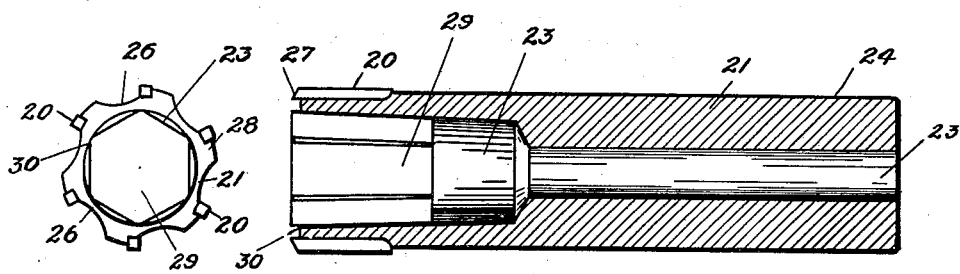
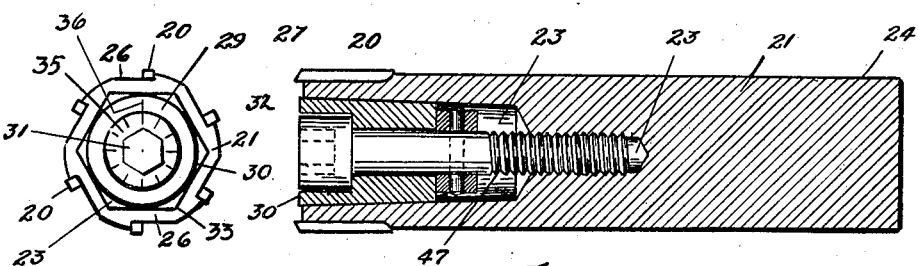
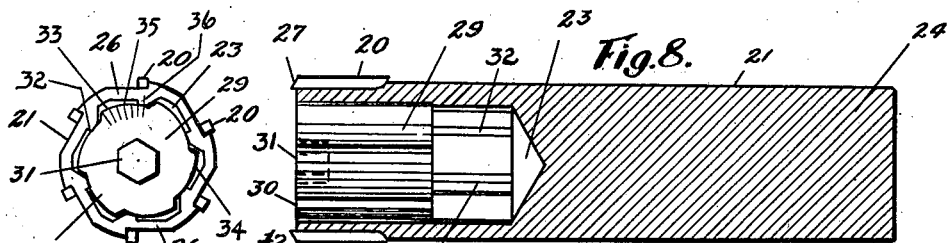
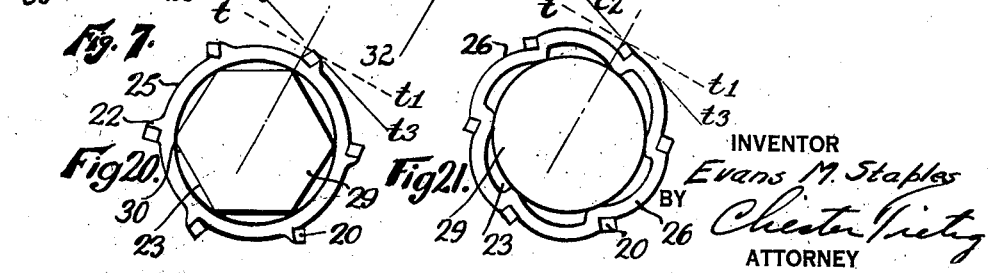
INVENTOR
Evans M. Staples
BY
Chester Tietz
ATTORNEY Sept. 21, 1937.  E. M. STAPLES  2,093,742
CIRCULAR CUTTING TOOL
Filed May 7, 1934  2 Sheets-Sheet 2
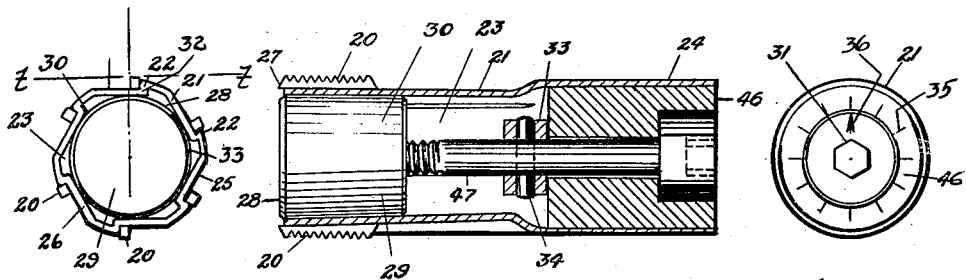
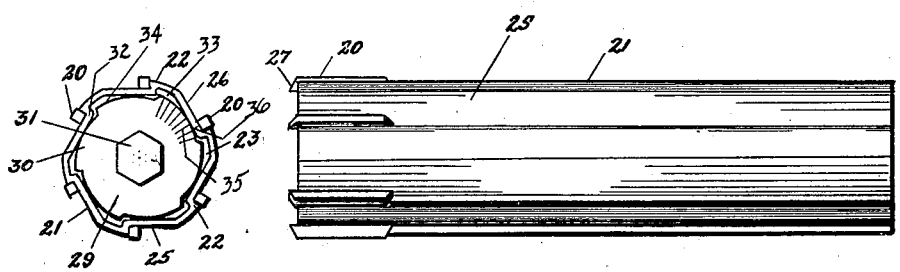
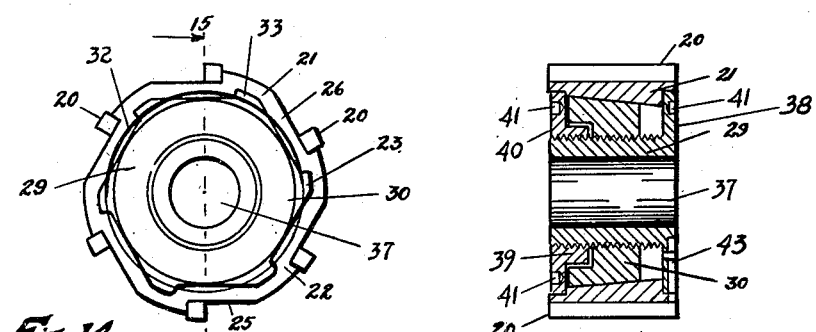
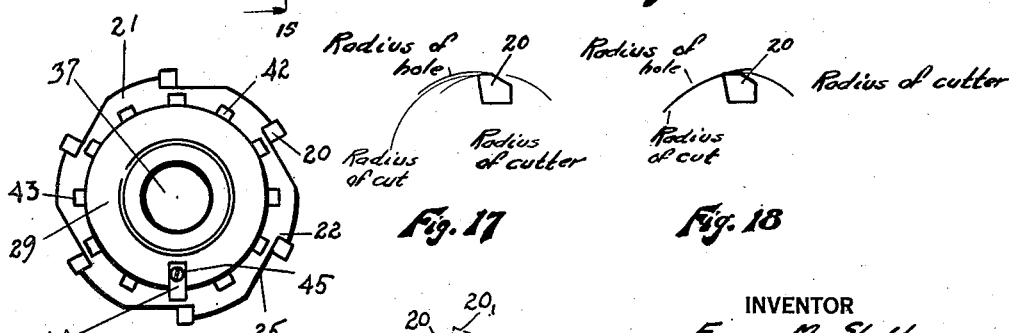
INVENTOR
Evans M. Staples
BY Chester Tietz
ATTORNEY Patented Sept. 21, 1937

2,093,742

UNITED STATES PATENT OFFICE 2,093,742

CIRCULAR CUTTING TOOL

Evans M. Staples, Cincinnati, Ohio

Application May 7, 1934, Serial No. 724,348

5 Claims. (Cl. 77—76)

This invention relates to circular cutting tools, especially those intended for metal working. The tools which may embody its use are reamers, taps and milling cutters.

The object of the invention is to provide tools of this character which are accurately adjustable as to diameter across the cutting edges and which possess the desirable character of solid tools while being easily regulatable as to size and during the course of such adjustment the clearance of the cutting edges is preserved by virtue of a rocking action given to the cutting edges during the expansion.

When solid tools of great accuracy are used in metal working, accuracy of the work that they operate upon is due to the rigidity of the tool and attendant lack of vibration or "chatter". This rigidity preserves the life of the cutting edges. When it becomes dull the tool must then either be plated with a hard metal such as chromium, and then be reground, or be reground to a smaller size without plating.

Expansion tools have been designed to overcome these disadvantages. I refer particularly to reamers and taps. In these, expansion is brought about by a tapered plug. Moving this plug further into the tool body expands that body. In one class of expansible tools the body is slotted so as to make the expansion easy; in the other class the plug expands the tool body radially. The slit tools have a tendency to chatter, while the tools of the second class do not preserve the correct cutting clearances on expansion. Therefore they tend to rub behind the cutting edges after expansion.

My invention may therefore be said to be an improvement upon the second class of these tools, the principle of the unimproved tools being shown in U. S. Patent 1,092,650 to Jacobs. In the construction the expansion of the tool body is truly radial and no cocking is imparted to the cutting edges.

Referring now to the drawings, Fig. 1 is an end view of one form of my invention applied to a metal cutting reamer. Fig. 2 is a side elevation of the same form.

Fig. 3 is an end view of a reamer comprising another modification. Fig. 4 is a side elevation, partly in section, of this form.

Fig. 5 is an end view of a reamer comprising another form of the invention. Fig. 6 is a side elevation, partly in section, of this form.

Fig. 7 is an end view of a reamer comprising a modification employing a cam-shaped cylindrical plug. Fig. 8 is a side elevation, partly in section.

Fig. 9 is an end view of a tap comprising a modification constructed with the use of a drawn metal shell. Fig. 10 is a side elevation, partly in section, of this form. Fig. 11 is a rear end view of the same form.

Fig. 12 is an end view of a reamer comprising a modification which may employ extruded tubing. Fig. 13 is a side elevation of this form.

Fig. 14 is a side view of a milling cutter embodying the invention. Fig. 15 is a cross section of this cutter along the line 15—15 of Fig. 14.

The longitudinal sections shown in Figures 4, 6, 8 and 10 are obtained by cutting the tools vertically on a line which would pass through the central axis. However, the expanding means in these tools are not shown as sections, but as side elevations. In other words, they are unsectioned.

Fig. 16 is a diagram of a cutting blade. The solid line shows the position before expansion of the tool, the dotted line shows the position assumed after expansion according to my invention.

Fig. 17 is a diagram which shows the rubbing effect of a dull cutter blade in a tool which has been expanded according to the prior art.

Fig. 18 is a diagram which shows the cutting effect obtained with a dull cutter blade after same has been expanded according to my invention.

Fig. 19 is a side view of the milling cutter, the side shown being the opposite one to that shown in Fig. 14.

Figs. 20 and 21 are representations of milling cutters in their expanded condition.

Referring now to all figures except the diagrams, 20 represents inserted cutting blades of hard material such as tool steel or tungsten carbide alloy. Such blades may be attached to a tool body 21 by brazing, electric welding or any other of the methods heretofore employed to hold such blades to bodies. An essential condition is that the blades 20 shall lie in grooves defined by shoulders 22 which support the cutting blades laterally.

The tool body 21 is hollow as to its forward portion, the hollow space being designated by 23. The hollow space may extend completely to the rear of the shank 24 of the tool as shown in Fig. 4 but generally it need extend only a part of the way as in Figures 6 and 10.

The grooves referred to are part of flutes 25, parallel to which the blades 20 lie. Such flutes are of ample breadth and depth to permit the tool to free itself of chips. The depth of such flutes is also sufficient to make the thickness of the connecting web 26 small enough so that it will stretch and deform under the influence of the stretching means, which is to be described.

The forward end 27 of the cutting blades 20 is bevelled, as shown at 28 in Figures 1, 2 and 3. In Figures 9 and 10, the forward end of the expanding means 29 may be bevelled as at 28.

The expanding means generally designated 29, comprises a plug 30 which is an essential element in all tools made according to my invention. The plug may be without taper as in Fig. 8 or may be tapered to a decreasing diameter toward the rear of the tool as shown in Figs. 4, 6, 10 and 15. Some device for advancing or retracting the plug longitudinally may be a part of the expanding means. In all figures except 5–6, 7–8, 9–11, 12–13 and 14–15, a hammer driving the plug into the tool body is the preferred expanding means, altho of course, the hammer is not regarded as a part of this invention.

In the figures just specifically listed a hammer is not necessary and a socket wrench is preferred. Here again the wrench is not a part of the invention, but the means upon which it may act is so regarded. Thus in Fig. 5, Fig. 7, Fig. 11 and Fig. 12, 31 is a hexagonal opening into which a correspondingly shaped wrench is to be inserted. In Figures 5–6 and 7–8 the opening 31 is in the forward end of the tool while in the form shown in Figures 9–10–11, the opening 31 is at the rear. The openings 31 are each sunk into the head of an adjusting screw 47 with which the plug is threadedly engaged in Fig. 10. In this construction the screw 47 is rotatable but longitudinally fixed by means of a washer 33, a pin 34 extending through both the washer and the screw. A fixed plug 46 is provided within the tool body at the rear thereof in the form shown in Fig. 10.

In the form shown in Fig. 6, the screw 47 may move longitudinally while rotating and carry the plug 30 with it. A washer and pin, similar to that shown in Fig. 10 is fixed on the screw shank so that rotation of the latter will move the plug backward when its retraction is desired.

The plug 30 may be of several different shapes, as shown, and still operate according to my invention. It may, besides being tapered or untapered, be polygonal as in Figures 1 to 4 inclusive or it may be round as in Figures 5, 6, 9 and 10 inclusive, or it may be fluted as in Figures 7 and 8, 12 and 13 to provide a plurality of cam surfaces about its periphery. The principle which runs through all of these forms is that the expansion is greater directly under the cutting edges of the blades than at any other part of the circumference. The cutting edges are therefore raised, not radially, but cocked according to the dotted line showing on Fig. 16, thereby imparting more clearance to the tool.

In the forms in which a hexagonal plug is employed (Figures 1 to 4 inclusive) each apex of the hexagon makes contact with the tool body immediately under one of the blade cutting edges. It is evident therefore that a blow driving the plug into the tool body and expanding the latter will tend to cause the body to take the same contour as the plug, which will bring about the cocking or addition of clearance to the tool as described.

Figs. 20 and 21 illustrate the tools in their expanded condition. In each figure the dotted line $t$—$t_1$ represents the outer surface of the cutting edge before expansion, and the solid line $t_2$—$t_3$ shows the same surface after the cutter has been expanded. The angle between the lines represents the clearance angle obtained by expansion.

In Figures 5 to 15 inclusive, and 19 I show forms of tools in which I am able to use a round plug 30 because I make the interior of the tool body irregular, and especially ridged under the tool edges, in contradistinction to the interiorly smooth bodies that I employ in the forms shown in Figures 1 to 4 inclusive. The irregularities or lands which have the beneficial effect of raising the tool edges are numbered 32. Other irregularities 33 are interior flutes, not prominences. These co-operate with the prominences 32 in expanding the tool, because the flutes render the tool body stretchable between the cutting blades 20. It will be seen therefore that in Figures 5 to 15 inclusive I have provided several geometrical forms of tool body which are peculiarly adapted to expansion to produce the blade-cocking effect described.

In Figures 7–8 and 12–13 I have provided a form of tool body in combination with a form of cylindrical plug in which tools the expanding effect is not produced by moving the plug in or out, but by rotating it. This is accomplished by inserting a hexagonal wrench into the socket 31 and rotating the plug in the direction of the gentlest slope of the cam surfaces. These are indicated by 34 on Figures 7 and 12. It is evident that when the plug 30 is so rotated that the interprominences 32 will be forced to ride up on the cam surfaces 34 and an immense leverage can be thus exerted to expand the tool body at points directly under the cutting edges. Since the degree of rotation governs the degree of expansion, a graduated scale 35 can be placed on the circumference of the plug 30, and a line of reference 36 on the tool body. In Fig. 11 it is shown how this scale may be applied to the rear of the tool. It is evident that it is immaterial whether the line of reference is on the plug or the tool body.

From the foregoing description it is believed that the operation of the taps and reamers and their expanding means will be evident to those skilled in the art. In order to be certain of understanding however I will state that the tools of my invention are used just as the corresponding solid tools are used until it is necessary to expand them.

In the preparation of tools of my invention the tool may be finished directly to the desired size, and relief when necessary obtained by conventional method. In such case the cocking action of the cutting blades is not of advantage when used at the machined or ground size. To facilitate manufacture and to secure uniformly and slightly relieved cutting edges I prefer to prepare these tools to a size slightly under the working size desired. I then expand to the working size, thus facilitating the accurate sizing of the tool and simultaneously obtaining the desired relief.

In the forms shown in Figures 1 to 4 inclusive, the plug 30 must be driven further into the tool body with a hammer or other appropriate tool until the desired expansion has been obtained, which fact can be checked by measuring with a micrometer the diameter of the tool at the cutting edges.

In the forms shown in Figures 5–6 and 9–10–11, a hexagon wrench is applied to hexagon socket 31 and rotated until the plug 30 travels a sufficient distance into the tool body.

Operation of the expanding means in the forms of Figures 7–8 and 12–13 is the same as that of Figures 5-6 and 9-10-11 except that it is likely that less rotation will be required, especially if the pitch of cam surfaces 34 is steep. Checking of the outside cutting diameter is necessary after each expansion step unless the tool is provided with a scale 35 and reference line 36 as shown in Figures 5, 7, 11 and 12. These scales are preferably so graduated that an increase of one division will create 0.001 inch expansion in the cutting diameter of the tool.

Referring now particularly to Fig. 15, the means peculiarly adapted to expanding an inserted tooth milling cutter are here shown. In a cutter having the configuration shown in Fig. 14, 37 is the hollow cylindrical space intended for the arbor. This space is the central axis of an outwardly threaded cylinder 29 with which a flange 38 is integral, this flange forming one side of the cutter. The head is recessed into a cylindrical tool body 21 in the periphery of which cutter blades 20 are mounted in the usual manner. The interior space of tool body 21 is of the general shape of the frustrum of a cone, the smaller end being toward the flange 38. There are however as many interior longitudinal flutes 33 in the tool body 21 as there are cutters. The general shape of the tool body is therefore similar to those shown for taps and reamers respectively in Figures 9 and 12 except for the interior taper. It is to be observed that the points of least diameter are directly under the cutting edges of cutters 20.

Within the tool body 21 there is a conical plug 30 which is recessed in its larger end to receive the projection 39 of a circular nut 40 which makes threaded engagement with the cylinder 29. The nut 40 forms a part of one side of the milling cutter. Both the nut 40 and the flange 38 on the opposite side are provided with detents 41 for the reception of the pins of a split wrench, i. e., one which can straddle the arbor (not shown).

Referring now to both Figures 15 and 19, the key means used for driving the cutter are here shown. The cutter body 21 is provided with a plurality of radial slots 43 which may be of approximately square shape while the flange 38 is provided with only one. When the slot in the flange is brought into register with that in the cutter body, a key 44 is fitted into both of them and locked by means of a screw 45 into cutter body 21. A driving connection is thereby established, the strength of which can be regulated by varying the dimensions or material of the key 45. If the safe stress upon the blades is exceeded, the key 45 can be made to break, thus keeping the expensive cutting blades 20 unharmed.

The procedure in expanding the milling cutter is as follows:

Nut 40 is first backed off slightly, the driving key 44 disengaged then head 38 and cylinder 29 are rotated so as to pull the plug 30 into closer engagement with the tool body 21 and expand same, particularly under the cutter edges. The driving key 44 is then engaged and nut 40 is then screwed into the cutter body again until it engages the larger end of plug 30 and so locks it in position.

It is to be understood that all of the reamers herein shown may be altered as to their blades, i. e., serrated and relieved, to make taps of them, or the converse may be done to make reamers of taps.

In manufacturing the tool bodies shown in Figures 5 to 14 inclusive, forging may be employed, i. e. a die may be forced into a hot circular tube to give it the desired configuration.

I claim as my invention:

1. In a reamer, a substantially cylindrical unbroken, expansible tool body, a plurality of parallel flutes of substantial length in the forward end thereof, said flutes being also parallel to the longer axis of the tool and having shoulders at one side, a plurality of cutting blades each adjacent one of said shoulders, a hollow space in the forward end of said tool body, the wall of said space having interior projections under the edges of the cutting blades, a tapered plug in said space adapted to make line contact with said tool body directly under the cutting edges of said blades and screw means engaging said plug and the rear of said tool body whereby said plug may be forced into the tool body to expand same and to bend same on lines directly under the cutting edges of the blades, the bending stresses acting to increase the clearance on said cutting blades by bending said body beneath and behind said cutting blades.

2. In a reamer, a cylindrical tool body, a plurality of parallel flutes in the forward end thereof, said flutes being also parallel to the longer axis of the tool body and having shoulders at one side, a plurality of cutting blades mounted on said body adjacent said shoulders, a substantially cylindrical hollow space in the forward end of said tool body, a tapered plug in said space, the small end of same being toward the rear of said tool body, longitudinal interior projections on the interior of the wall of said hollow space, said projections being slightly to the front of the cutting edges of the blades, said plug making line contact for a substantial proportion of its length with said tool body directly under said cutting edges and screw means threadedly engaging said plug and said tool body whereby said plug can be forced into said tool body to expand the latter at point under the cutting blades to a greater degree than elsewhere.

3. In a milling cutter, a hollow cylindrical tool body, a plurality of substantially longitudinal blades on the outer surface of said body, a plurality of longitudinal lands on the interior of the body and radially beneath the cutting edges, said lands being longitudinally tapered, a correspondingly tapered expanding cone within the body, and means to move the cone longitudinally of the body, so that the body may be deformed to increase the cutting edges and back clearance of the blades.

4. In an expansible cutting tool, the combination which comprises a substantially cylindrical body having an opening substantially concentric with its longitudinal axis, a plurality of substantially radial cutting-edged blades arranged about the cylindrical body, expanding means in said opening of a configuration such that it makes contact with the said body along narrow areas adjacent the cutting edges of the said blades, the center of pressure of each area of contact of the plug against the shell being forward of a radial plane thru the midsections of the corresponding cutting blade whereby the configuration of the shell may be changed to increase the cutting diameter and back clearance of the blades, and means within said tool body to operate said expanding means.

5. In an expansible circular cutting tool, the combination which comprises an unbroken substantially cylindrical body capable of being circumferentially expanded and having an opening, said opening being concentric with the longitudinal axis of said body, a plurality of flutes and shoulders alternatively arranged on the circumference of the forward end of said body parallel to the longitudinal axis thereof, cutting blades abutting said shoulders and being arranged substantially radial, expanding means in said opening making contact with the said body on lines substantially and only under the cutting edges of the said blades and capable of expanding the said body circumferentially by bending same on lines running directly under the cutting edges of the said blades, and means within said tool body to operate said expanding means.

EVANS M. STAPLES.